United States Patent
Puram

(10) Patent No.: US 6,269,479 B1
(45) Date of Patent: Jul. 31, 2001

(54) METHOD AND COMPUTER PROGRAM PRODUCT FOR EVALUATING THE PERFORMANCE OF AN OBJECT-ORIENTED APPLICATION PROGRAM

(75) Inventor: Chith K. Puram, Yorktown, VA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/203,201

(22) Filed: Nov. 30, 1998

(51) Int. Cl.[7] .................................................. G06F 9/45
(52) U.S. Cl. ............................................................ 717/4
(58) Field of Search ........................ 717/1, 2, 4; 714/35, 714/38; 706/25, 26; 713/320; 703/16, 17, 24

(56) References Cited

U.S. PATENT DOCUMENTS

| | | | |
|---|---|---|---|
| 5,345,579 | * | 9/1994 | Hynes ................................ 395/500 |
| 5,721,583 | * | 2/1998 | Harada et al. ...................... 348/12 |
| 5,835,902 | * | 11/1998 | Jannarone ............................. 706/26 |
| 5,919,263 | * | 7/1999 | Kikinis et al. ...................... 713/320 |

* cited by examiner

*Primary Examiner*—Kakali Chaki
(74) *Attorney, Agent, or Firm*—Mark T. Starr; Woodcock Washburn Kurtz Mackiewicz & Norris LLP; Lise A. Rode

(57) ABSTRACT

A measure of the performance of an object-oriented application program is obtained by measuring, for a plurality of the user input functions of the application program for which a response is provided by the application program, an elapsed time between the initiation of the user input function and the response provided thereto by the application program. The measured elapsed times for each user input function are summed, and then an average response time is obtained for the application program by dividing that sum by the number of user input functions sampled. The measure of performance of the application program may be normalized with respect to a Function Point index derived for the application program. Additionally, for application programs that operate upon a database, the measure of performance may be further normalized with respect to the size of the database.

6 Claims, 1 Drawing Sheet

METHOD AND COMPUTER PROGRAM PRODUCT FOR EVALUATING THE PERFORMANCE OF AN OBJECT-ORIENTED APPLICATION PROGRAM

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to object-oriented programming, and more particularly, to a method and computer program product for evaluating and comparing the performance of object-oriented application programs.

2. Description of the Prior Art

Unlike programs that are executed in a batch processing mode, the flow of an object-oriented application program is determined by the way in which a user interacts with the object-oriented application program and the speed with which the application program responds to user input. It would desirable if there were a way to measure the relative performance of two object-oriented application programs. The present invention satisfies this need.

SUMMARY OF THE INVENTION

According to the present invention, a measure of the performance of an object-oriented application program is obtained by measuring, for a plurality of the user input functions of the application program for which a response is provided by the application program, an elapsed time between the initiation of the user input function and the response provided thereto by the application program. The measured elapsed times for each user input function are summed, and then an average response time is obtained for the application program by dividing that sum by the number of user input functions sampled. The average response time represents a measure of the performance of the application program. An application program developer can use this measure to compare the performance of one application program to another. In a preferred embodiment, the measure of performance of the application program is further normalized with respect to a Function Point index derived for the application program. Additionally, for application programs that operate upon a database, the measure of performance is further normalized with respect to the size of the database on which it is operating.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
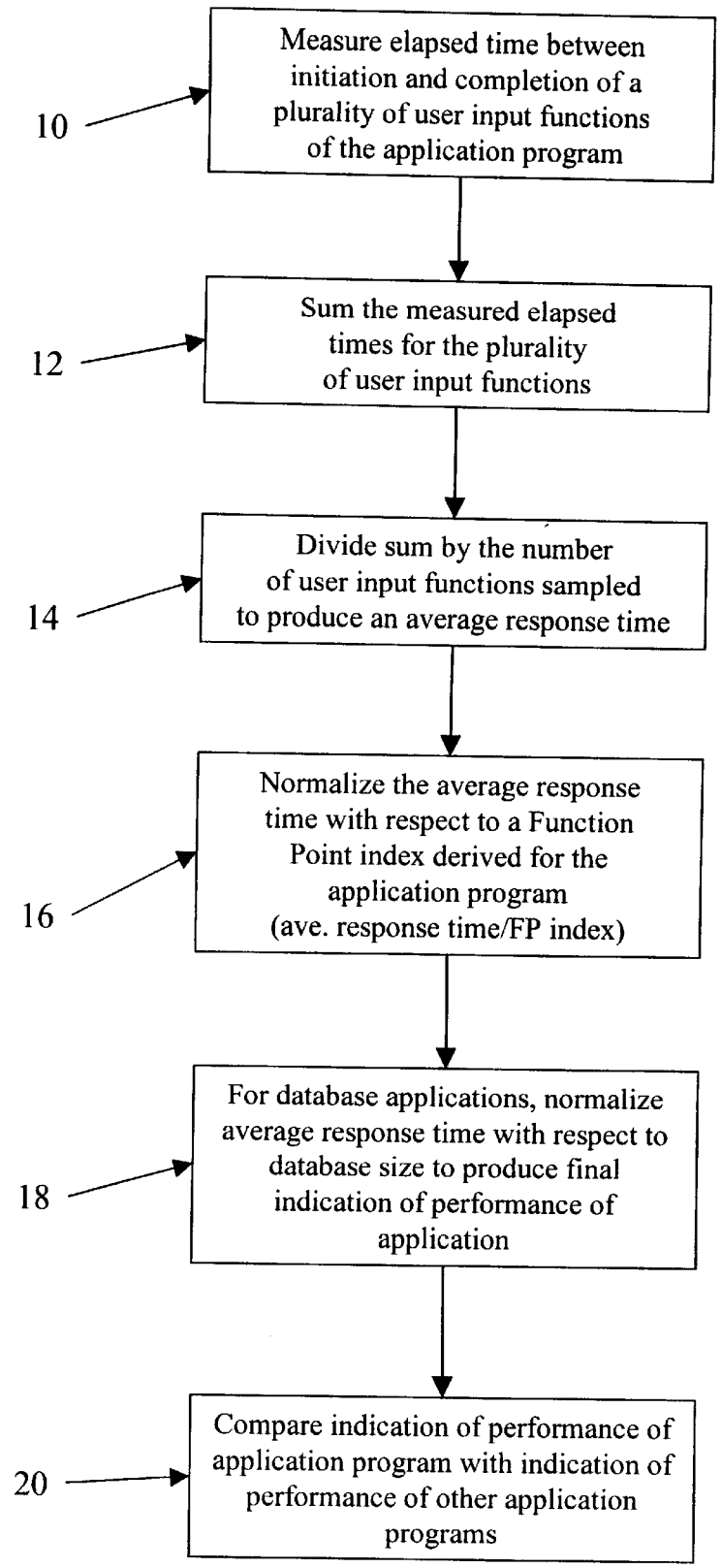
FIG. 1 is a flow diagram illustrating the method of the present invention, in accordance with a preferred embodiment thereof.

The present invention is directed to a method for evaluating and comparing the performance of object-oriented application programs. The method of the present invention may take the form of a computer program product comprising program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The method of the present invention may also be embodied in the form of program code that is transmitted over some transmission medium, such as over electrical wiring or cabling, over the Internet or any other network, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Referring to the drawings, wherein like numerals represent like elements throughout, FIG. 1 is a flow diagram illustrating the method of the present invention, in accordance with a preferred embodiment thereof. At step 10, a plurality of user input functions of an object-oriented application program are sampled to obtain, for each sampled user input function, a measure of the elapsed time between the initiation of the user input function by a user of the application program and the completion of the function (i.e., the arrival of the response provided by the application program).

Examples of user input functions include, a request to open a new window (the response being the opening of the window), a mouse press or keyboard press on a particular menu or toolbar item (the response being some action, for example, a menu item labeled "Print" may bring up a print dialog box, a toolbar item labeled "Sort" may sort the displayed data or bring up a sort window), a request for retrieval of data from a database (the response being the actual output of the data to the screen), a mouse press on a particular row of data in a spreadsheet (the response being the highlighting of that row on the screen), or any other similar user input function for which some response by the application program is expected. Ideally, a measure of elapsed time for every user input function of the application program under test should be obtained. However, when this is not feasible, at least a substantial number of user input functions should be sampled. Preferably, at least a number necessary to achieve statistical significance should be obtained. A given user input function can be sampled once, or more than once, so long as each sample is counted separately in the steps below (i.e., steps 12 and 14).

Obtaining a measure of the elapsed time between user initiation of a user input function and the corresponding response by the application program can be achieved in a number of ways. As one example, additional program code can be provided in the application program itself. For example, the following additional code could be added to a method that performs a given user input function:

```
user_input_function (param1, param2) {
    real time_zero, time_complete;
    real elapsed_time;
    time_zero = timer();
```

```
            // user function code goes here
            time_complete = timer();
            elapsed_time = time_complete - time_zero;
            record (elapsed_time);
            return;
    }
```

In this example, the program code that is added to the exemplary user_input_function( ) (i) establishes variables to hold beginning, ending, and elapsed time values, (ii) records a starting time at the beginning of method execution (time_zero =timer( )) by calling a procedure (e.g., timer( )) that returns a time indication, (iii) records an ending time just before the method returns (time_complete =timer( )), and (iv) then records the elapsed time (time_complete—time_zero), for example, to a file, using a record( ) method. The timer( ) method can be any system-level method or system call that returns a time value, and its particular name may very from platform to platform. A record( ) method that records a value in a file or to some output device can be implemented in a number of ways, and its implementation may again depend upon the platform.

Next, at steps 12 and 14, the measured elapsed times obtained in step 10 are summed, and then divided by the total number of samples taken. The result is an average response time of the application, which provides an indication of the performance of the application program.

Because the average response time of an application, as derived in steps 10–14 above, can vary as a function of the size and complexity of the application program, according to an additional feature of the present invention, the average response time of the application program is normalized in step 16 with respect to a Function Point index derived for the application. The Function Point index is a measure of the size and complexity of an application program and is derived through a technique known as Function Point Analysis (FPA). Function Point Analysis is a standardized technique maintained by the International Function Point User Group (IFPUG). One variant of the basic method is known as MkII Function Point Analysis. Other variants also exist. Any variant of the Function Point technique may be employed in connection with the present invention. In step 16, a Function Point index is derived for the application program, and then the average response time obtained in step 14 is divided by the Function Point index. By normalizing the average response time in this manner, applications with different sizes and complexities can more accurately and effectively be compared.

Finally, in step 18, for application programs that operate upon a database, a further normalization is performed to account for the fact that the size of a database can affect the average response time obtained in steps 10–14. Specifically, in accordance with this additional feature of the present invention, the average response time is further divided by a measure of the size of the database upon which the application program operates. For example, the average response time may be divided by the size of the database in Gigabytes. By normalizing the average response time with respect to database size, more accurate and effective comparison of application programs that operate upon different size databases is achieved.

After normalizing the average response time with respect to the Function Point index, and if applicable, also with respect to database size, a final measure of the performance of the application program is obtained. This measure of performance may then be used to compare the relative performance of two or more application programs, as indicated in step 20.

As the foregoing illustrates, the present invention is directed to a method for evaluating and comparing the performance of object-oriented application programs. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A computer-based method for measuring the performance of an object-oriented application program, comprising the steps of:

measuring, for a plurality of user input functions of the application program for which a response is provided by the application program, an elapsed time between the initiation of the user input function and the response provided thereto by the application program;

summing the measured elapsed times; and obtaining an average response time for the application program by dividing the sum of the measured elapsed times by the number of user input functions for which a measured elapsed time was obtained, the average response time representing a measure of the performance of the application program.

2. The method recited in claim 1, further comprising the step of normalizing the measure of the performance of the application program with respect to a Function Point index derived for the application program.

3. The method recited in claim 1, wherein for an application program that operates upon a database, the method further comprises normalizing the measure of the performance of the application program with respect to the size of the database.

4. A computer-readable medium having program code stored thereon that, when executed by a computer, provides a measure of the performance of an object-oriented application program for comparison with other object-oriented application programs, the program code causing the computer to:

(i) measure, for a plurality of user input functions of the application program for which a response is provided by the application program, an elapsed time between the initiation of the user input function and the response provided thereto by the application program;

(ii) sum the measured elapsed times; and (iii) obtain an average response time for the application program by dividing the sum of the measured elapsed times by the number of user input functions for which a measure of elapsed time was obtained, the average response time providing the measure of the performance of the application program.

5. The computer-readable medium recited in claim 4, wherein the program code further causes the computer to normalize the measure of the performance of the application program with respect to a Function Point index derived for the application program.

6. The computer-readable medium recited in claim 4, wherein for an application program that operates upon a database, the program code further causes the computer to normalize the measure of the performance of the application program with respect to the size of the database.

* * * * *